No. 614,167.  
J. GARDELLA.  
FRUIT PICKING SHEARS.  
(Application filed Dec. 3, 1897.)  
Patented Nov. 15, 1898.
(No Model.)
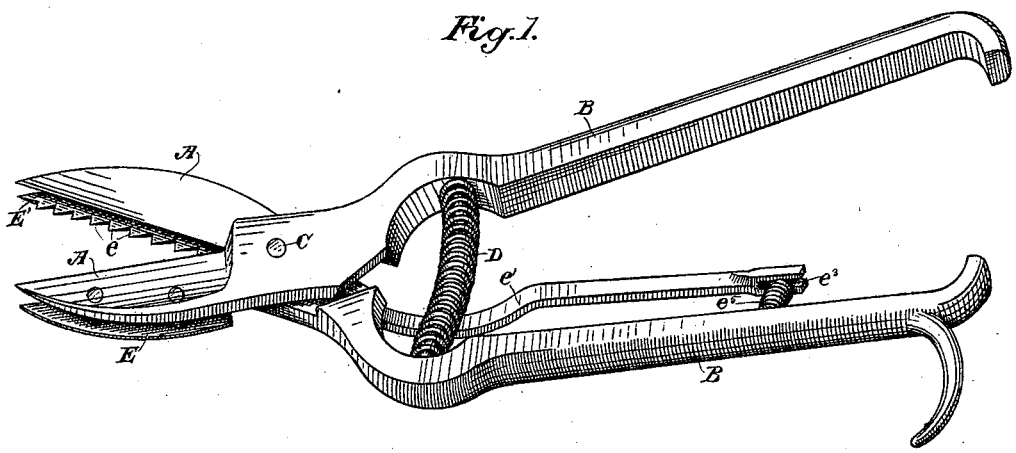
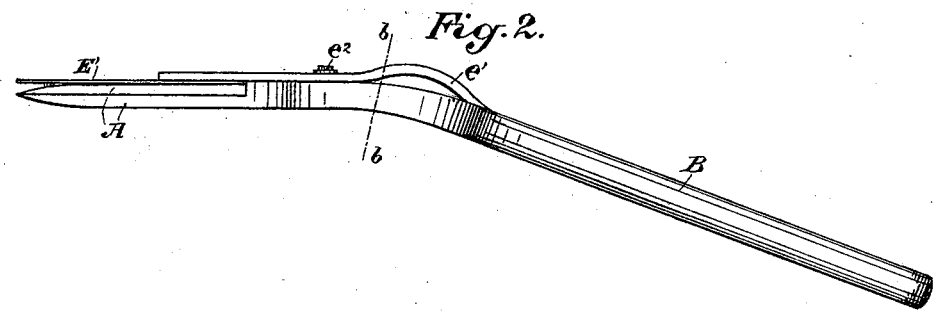
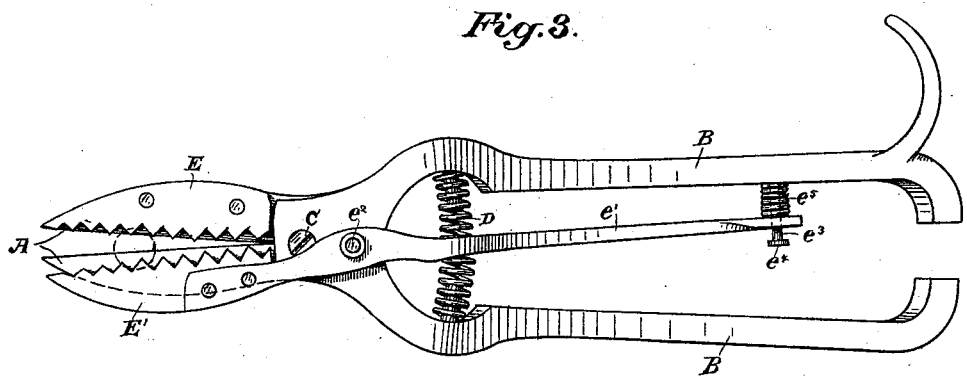
Witnesses  
H. F. Ascheck  
Walter F. Vane
Inventor  
John Gardella  
by Wm. F. Booth  
his Attorney.

United States Patent Office.

JOHN GARDELLA, OF OROVILLE, CALIFORNIA, ASSIGNOR OF ONE-HALF TO GEORGE H. MATTHEWS, OF SAME PLACE.

FRUIT-PICKING SHEARS.

SPECIFICATION forming part of Letters Patent No. 614,167, dated November 15, 1898.

Application filed December 3, 1897. Serial No. 660,617. (No model.)

*To all whom it may concern:*

Be it known that I, JOHN GARDELLA, a citizen of the United States, residing at Oroville, in the county of Butte and State of California, have invented certain new and useful Improvements in Fruit-Picking Shears; and I do hereby declare the following to be a full, clear, and exact description of the same.

My invention relates to the class of shears or clippers specially adapted for picking fruit; and it consists in a pair of shears having means, operating in conjunction with the cutting-blades, to grip the severed stem of the fruit and hold it, thereby preventing the fruit from falling and enabling the operator to safely transfer it to the receptacle, the whole operation of cutting, gripping, holding, and depositing being accomplished with one hand.

My invention also consists in certain details of construction of the gripping device and of the shears themselves, all of which I shall hereinafter fully describe.

In picking grapes, oranges, and other fruit requiring the use of hand-shears both hands of the worker are usually required, the one to use the shears and the other to grasp the fruit to prevent it from falling when the stem is cut.

The main object of my invention is to provide a simple, practical, and effective gripping device operating in connection with the shears to grip the stem as it is severed, and thereby to hold the fruit and enable it to be safely deposited, and all with the use of one hand, thus leaving the other free for greater convenience or utility, as the case may be.

Another object of my invention is to provide a gripping device of such character that while capable of firmly holding the stem it will not bruise or crush it and will let it slip readily when released.

Referring to the accompanying drawings, Figure 1 is a perspective view of my shears. Fig. 2 is a top edge view of same. Fig. 3 is a side elevation showing the operation of the stem grip or holder.

The shears comprise the blades A and handles B, pivoted at C and having a controlling-spring D. The grip or holder for the severed stem consists of opposing plates E and E', one on the face of one blade and the other on the face of the other blade. Their distance from the blades is such as to enable them to get a sufficiently firm hold on the stem, and this distance is regulated to suit the fruit to be picked, and their position with relation to each other is such that their adjacent edges will clamp and grip the stem as the blades sever it. This grip on the stem might be had with the edges of the plates smooth; but the best form for these edges is an irregular one of some character—such as a broken one, a corrugated or roughened one, an indented edge, or, as I have here shown, a serrated interengaging one—which edge I have found to be the best of all, as affording a firm and perfect hold on the stem. In practice I make the inner holding edge of each grip-plate beveled, as shown at $e$, so that when the shears are opened and the grip-plates separated the stem will the more readily slip from said plates. Now in order to prevent the stem from being bruised or crushed by an unnecessarily strong grip I provide that the grip-plates shall exercise a yielding pressure in grasping the stem. To this end one or both plates may be made to yield. In practice one—say plate E—is fixed rigidly to its blade A, while the other, E', is carried by a shank $e'$, pivoted to the shears at $e^2$ and thence extending in a plane between the handles B to a stud $e^3$, secured to one of said handles. Upon this stud the shank is fitted to freely slide, being limited by the head $e^4$ of the stud and held out against said head by a spring $e^5$. The tension of this spring is sufficient to hold the grip-plate E' up to its work with the fixed grip-plate E, and yet to permit said plate E' to yield backwardly before too strong a pressure, thus preventing the stem from being crushed. The shank $e'$ being bent, as shown, so that its rear extremity lies between the handles, is well out of the way and does not interfere with the use of the shears nor hurt the hand in operating them.

The shears are bent laterally at such line in their length, as shown at $b\ b$, as will enable the blades to reach the stem squarely, while permitting the operator to hold his wrist naturally without bending or twisting it.

Having thus described my invention, what I claim as new, and desire to secure by Letters Patent, is—

1. Fruit-picking shears comprising pivoted blades and handles, a gripping-plate on the face of each blade, a shank carrying one of said plates and pivoted to the handles, said shank being bent so that its rear extremity lies between the handles, and a spring controlling said extremity, whereby the gripping-plate which said shank carries is rendered yielding.

2. Fruit-picking shears comprising pivoted spring-controlled blades and handles, a gripping-plate fixed to the face of one blade, a gripping-plate movable over the face of the other blade, a shank carrying said movable plate and pivoted to the handles, a fixed stud on one of the handles upon which the free extremity of the shank plays and a spring on the stud to control said shank and the plate it carries.

3. Fruit-picking shears comprising pivoted spring-controlled blades and handles, a gripping-plate fixed to the face of one blade, a gripping-plate movable over the face of the other blade, said plates having their gripping edges serrated and interengaging, a shank carrying the movable plate and pivoted to the handles, a fixed stud on one of the handles upon which the free extremity of the shank plays and a spring on the stud to control said shank and the plate it carries.

In witness whereof I have hereunto set my hand.

JOHN GARDELLA.

Witnesses:
LOUIS N. HENDRICKS,
JAS. FOX.